United States Patent Office 3,427,262
Patented Feb. 11, 1969

3,427,262
CROSS-LINKED ACRYLATE POLYMERS
Herbert Corte, Opladen, and Harold Heller, Leichlingen, Germany, assignors to Farbenfabriken Bayer Aktiengesellschaft, Leverkusen, Germany, a corporation of Germany
No Drawing. Filed Nov. 15, 1966, Ser. No. 594,413
Claims priority, application Germany, Dec. 31, 1965, F 48,066
U.S. Cl. 260—2.2      10 Claims
Int. Cl. C08f 15/16; B01j 1/08

ABSTRACT OF THE DISCLOSURE

A homogeneous of macroreticular copolymer of an acrylic acid ester and 2–20% of a cross-linking agent of the formula

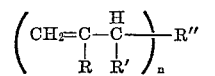

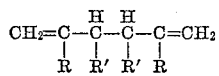

or

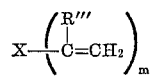

wherein

R″ is a polyvalent alkyl radical having 1–14 carbon atoms;
R, R′ and R‴ are defined as hydrogen or alkly having 1–6 carbon atoms;
X is cyclohexane or cyclopentane; and
m and n are 2–3;

and the corresponding insoluble anion and cation exchangers utilizing the defined copolymer as a matrix.

---

It has already been proposed (cf. German Auslegeschrift No. R 3973,85b, 1/05) to use copolymers of acrylic esters and cross-linking agents containing two polymerizable double bonds, for example, divinyl benzene, allyl methacrylate, vinyl methacrylate, glycol dimethacrylate, glycol diacrylate and other polyunsaturated carboxylic acid esters, in the production of weakly acid cation exchanger resins containing carboxyl groups. Vinyl, allyl and homologous ethers have also been mentioned as cross-linkers (cf. Hungarian patent specifications Nos. 149,973 and 145,775).

It has further been proposed to prepare the aforementioned copolymers in the presence of other polymerizable compounds containing olefinic double bonds, such as vinyl alcohol or vinyl chloride (cf. French patent specification No. 889,711).

It is possible, by subjecting copolymers of this kind to alkaline or acid hydrolysis (cf. Houben-Weyl, "Methoden der organischen Chemie," vol. XIV/2, pp. 705 et seq. (1963)), to obtain weakly acid cation exchanger resins containing carboxyl groups. They have a gel structure and, in most instances, are transparent, glossy materials. It is also known, however, to produce carboxyl-group-containing cation exchangers of corresponding composition which have a sponge-like structure. In this instance, the exchanger particles are permeated by fine pores and are milky, opaque to nontransparent (white) in appearance, cf. German Auslegeschrift No. 1,113,570 and Hungarian patent specification No. 149,973.

All these known weakly acidic cation exchangers containing carboxyl groups still contain soluble components sometimes in considerable quantities. This is not surprising where acrylate copolymers cross-linked with polyunsaturated carboxylic acid esters or polyunsaturated ethers are used, because the alkaline or acid hydrolyses of the acrylate groups to form the free carboxylic acid is also accompanied by hydrolysis of these cross-linker molecules. However, the use of nonhydrolyzing cross-linkers, e.g., of divinyl benzene, do not result in the formation of completely insoluble products either. Polymers which are not uniformly cross-linked and which consequently contain substantial amounts of uncross-linked polyacrylate, are always formed. This is believed to be caused by the different polymerization speeds of the acrylate monomer and the cross-linker. ("Polyacrylate" is used to describe the carboxylic acid derivative polymer generally.) When these polymers are used in the production of ion exchangers, their content of uncross-linked or very weakly cross-linked polyacrylate represents a serious disadvantage. It is, for example, quite impossible to use them in the purification of drinking water. The un-cross-linked parts of the polymer are more or less quickly dissolved and the weakly cross-linked portions are gradually dissolved. The same situation arises if anion exchangers are produced by aminolysis of the polymers with monovalent amines (monovalent with respect to the aminolysis reaction), e.g., if the polymers are aminolyzed with N,N-dimethylethylene diamine; N,N-dimethylpropylene-1,3-diamine or N,N-diethylpropylene-1,3-diamine.

Object of this invention are ion exchange resins with improved properties, more especially carboxylic groups containing cation exchangers and amino groups containing anion exchangers which are completely cross-linked by means of a cross-linking agent which is not susceptible to hydrolysis and which exchangers therefore are insoluble in water, alkaline or acid aqueous media. These ion exchangers are especially useful in treating drinking water.

A further object of this invention is a process for producing these ion exchangers as described below. Further objects are the preparation of the ion exchange matrix, i.e., the cross-linked acrylate polymer which is to be hydrolyzed or aminolyzed. A still further object is this ion exchange matrix itself.

These objects can be achieved by first producing the ion exchange matrix and then hydrolyzing or aminolyzing it. The ion exchange matrix is essentially a copolymer of an acrylic acid ester and of an aliphatic or cycloaliphatic hydrocarbon which contains two or more allyl groups and, if desired, a further nonhydrolyzing cross-linking agent.

Acrylic acid esters which may be used in producing these copolymers are esters of short chain (1 to 12 carbon atoms), normal and branched aliphatic and cycloaliphatic alcohols as well as phenols and acrylic acid. Especially useful are acrylic acid esters, the alcohol component of which is an aliphatic alcohol containing 1 to 4 carbon atoms.

Aliphatic or cycloaliphatic hydrocarbons with two or more allyl groups preferably contain 2 or 3 allyl groups and up to 20 carbon atoms. Hydrocarbons with two or more allyl groups are preferably compounds of the formula

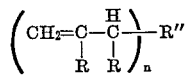

wherein R and R' independently represent hydrogen and alkyl having 1 to 6 carbon atoms and R" represents a polyvalent alkyl radical having 1 to 14 carbon atoms, $n$ represents preferably 2 and 3, if $n$ represents 2, R" may be replaced by a single bond. Additionally, compounds of the formula

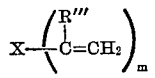

wherein X is a cyclohexane or cyclopentane radical, R''' represents hydrogen and $C_1$–$C_6$ alkyl and $m$ represents 2 or 3, may advantageously be used. They are exemplified by the following compounds: Hexa-1,5-diene, 2-methylhexa-1,5-diene, 2,5-dimethylhexa-1,5-diene, 3,4-diethylhexa-1,5-diene, 2-methyl-5-isopropylhexa-1,5-diene, hepta-1,6-diene, nona-1,8-diene and 1,2,4-trivinylcyclohexane, 1,3-divinylcyclohexane, 1,3-divinylcyclopentane.

Suitable further cross-linking agents which may be used in addition to the allyl groups containing monomers are for example divinyl benzene, trivinyl benzene and divinyl naphthalene.

In preparing the acrylate copolymers the extent of cross-linking, that means the amount of allyl groups containing monomer may be varied within wide limits. Preferably monomer mixtures containing 2 to 20% by weight, preferably 5 to 15% by weight of the aliphatic or cycloaliphatic hydrocarbon containing the allyl groups and 98 to 80%, preferably 95 to 85% by weight of an acrylic acid ester are subjected to polymerization.

In a preferred embodiment of the invention one of the additional cross-linking agents mentioned above is used in addition to the allyl groups containing monomer. The preferred additional cross-linking agent is divinyl benzene. The preferred monomer mixture to be polymerized in this case contains the acrylic ester and 2 to 20% by weight, preferably 3 to 8% by weight of the additional cross-linker, preferably divinyl benzene, and 2 to 12% by weight, preferably 2 to 5% by weight of the hydrocarbon containing 2 or more allyl groups. Percentages are based on the total monomer mixture, the main constituent being the acrylic acid ester.

In producing the ion exchange matrix, these monomer mixtures are subjected to polymerization either in bulk or preferably in suspension. The suspending agents and catalysts which form free radicals necessary for the polymerization are conventional and known per se. It is even possible to use additional monomers containing olefinic double bonds, for instance styrene, ethylstyrene, esters of vinyl alcohol, without effecting the properties of the matrix. This type of polymerization per se is conventional. The polymerization is carried out usually at temperatures between 20 and 100° C., the suspending medium preferably is water which contains a suspension agent and the catalyst usually is an organic peroxide, for instance dibenzoyl peroxide (cf. Houben-Weyl, "Methoden der organischen Chemie," vol. XIV, 1, pp. 1053–1057, (1961), which is included by reference).

In a special embodiment of this polymerization the matrices are produced in the form of macroporous or sponge-like polymers. These matrices are opaque or translucent in appearance and are permeated by small veins. They are obtained if the polymerization is carried out as a suspension polymerization in the presence of organic solvents, wherein the monomers to be polymerized are soluble but wherein the polymer formed is insoluble and does not or only sparingly swell. Suitable organic solvents of this type which should appropriately be called nonsolvents and nonswelling agents, are for example aliphatic hydrocarbons, alcohols, ethers, nitro compounds and esters.

The ion exchange matrices obtained in this way contain practically no uncross-linked i.e., soluble parts. This in fact is very surprising as insoluble copolymers cannot be obtained by copolymerizing methyl methacrylate with hexa-1,5-diene (Proc. Roy. Soc. (London), Ser. A–163 (1937) 216).

In producing ion exchangers from these matrices there are two possibilities: Cation exchangers are formed by hydrolyzing the acrylic ester groups of the copolymers to form the free carboxylic acid. This hydrolysis is usually carried out by heating the copolymers in suspension in an aqueous alkaline solution. Suitable aqueous alkaline solutions are for instance 5 to 25% by weight solutions of sodium or potassium hydroxide. Those solutions are heated advantageously to temperatures between 60° C. and the boiling point of the solution for, for instance, 2 to 20 hours. This time normally is sufficient to effect a complete hydrolysis (cf. Houben-Weyl, "Methoden der organischen Chemie," vol. XIV/2, pp. 705 et seq. (1963)). At the end of this reaction the ion exchanger is recovered by separating off the resin. It may then be transformed into its acid form by reacting it with a dilute acid.

In producing anion exchangers the reaction to be carried out is an aminolysis. This is done by reacting the ester groups containing polymer with an amine as described in U.S. patent specification No. 2,675,359, especially in column 2, line 45, to column 4, line 19, which is included by reference.

The copolymers and ion exchanger resins produced in accordance with the invention are examined for cross-linked, i.e., soluble components, by extraction with suitable solvents, followed by quantitative determination of the dissolved material contained in the extract, or by measurement of the reduction in weight of the copolymers after extraction.

Example 1

A mixture of 3940 g. of methyl acrylate, 560 g. of industrial divinyl benzene (64.34% pure, the rest being ethyl styrene), corresponding to 8% of 100% pure divinyl benzene based on the total monomer quantity, and 22.5 of dibenzyl peroxide, is suspended in 4.5 liters of water containing 6.75 g. of methyl cellulose and bead-polymerized for 5 hours at 65° C. and for 2 hours at 90° C. The beads thus formed are then dried in vacuo at 100° C.

A sample of the bead polymer thus obtained, dried until its weight is constant, undergoes a reduction in weight of 2.5% on thorough extraction with benzene. The residue after evaporation of the benzene extract comprises 2.4% by weight, based on the amount of bead polymer used.

400 g. of the bead polymer obtained as described above, are boiled under reflux for 8 hours in 2000 ml. of 10% by weight aqueous soda lye. After the reaction liquid has been washed through in a filter tube, the cation exchanger which is obtained is converted into the H-form with excess 3% by weight hydrochloric acid and then washed until neutral. 200 ml. of the cation-exchanger resin thus obtained are extracted for 24 hours with full desalted water in a Soxhlet apparatus. The acid content of the extract is 1.7 mval.

If 5% by weight of divinyl benzene and 3% by weight of 1,2,4-trivinyl-cyclohexane are used in place of 8% by weight of divinyl benzene in the above example, a bead polymer is obtained which undergoes a reduction in weight of 0.8% on thorough extraction with benzene. The residue after evaporation of the benzene extract comprises 0.7% by weight, based on the amount of bead polymer used.

Hydrolysis of the bead polymer and extraction of a 200 ml. sample of the cation exchanger in the H-form, are carried out as described above. The acid content of the extract is less than 0.1 mval.

If 5% by weight of divinyl benzene and 3% by weight of hexa-1,5-diene are used in place of 8% by weight of divinyl benzene in the above example, a bead polymer is obtained which undergoes a reduction in weight of 0.5% on thorough extraction with acetone.

Example 2

A mixture of 3933 g. of methyl acrylate, 567 g. of industrial divinyl benzene (63.48% pure, the rest being ethyl styrene), corresponding to 8% by weight of 100% pure divinyl benzene, based on the total monomer quantity, 675 g. of white spirit and 22.5 g. of dibenzoyl peroxide, is suspended in 4.5 liters of water in which 6.75 g. of methyl cellulose are dissolved, and then bead polymerized and dried as described in Example 1.

The bead polymer undergoes a reduction in weight of 4.5% on extraction with benzene, and reduction in weight of 4.3% on extraction with acetone.

The bead polymer is hydrolyzed as described in Example 1. After a 200 ml. sample of the cation exchanger thus obtained has been extracted for 20 hours with fully desalted water, the acid content of the extract is 1.9 mval.

If, in the above example, 5% by weight of divinyl benzene and 3% by weight of 2,5-dimethylhexa-1,5-diene are used in place of 8% by weight of divinyl benzene, a bead polymer is obtained which undergoes a reduction in weight of 1.5% on extraction with benzene, and a reduction in weight of 1.3% on extraction with acetone.

After the bead polymer has been hydrolyzed as in Example 1, and a 200 ml. sample of the cation exchanger thus obtained extracted for 20 hours with fully desalted water, the acid content of the extract is less than 0.1 mval.

If, in the above example, 12% by weight of 1,2,4-trivinyl-cyclohexane are used in place of 8% by weight of divinyl benzene, a bead polymer is obtained which, on extraction with benzene, undergoes a reduction in weight of 0.8%.

If 6% by weight of divinyl benzene and 2% by weight of hexa-1,5-diene are used in place of 8% by weight of divinyl benzene, a bead polymer is obtained which undergoes a reduction in weight of 1.1% on extraction with benzene and a reduction in weight of 0.7% on extraction with acetone.

Example 3

A mixture of 3913 g. of methyl acrylate, 587 g. of industrial divinyl benzene (61.27% pure, the rest being ethyl styrene), corresponding to 8% by weight of 100% pure divinyl benzene, based on the total monomer quantity, 900 g. of white spirit and 22.5 g. of dibenzoyl peroxide is suspended in 4.5 liters of water in which 6.75 g. of methyl cellulose are dissolved, and then bead polymerized and dried in accordance with Example 1.

Extraction of the bead polymer with benzene produces a reduction in weight of 9.5%. The residue after evaporation of the benzene extract comprises 9.3% by weight, based on the amount of polymer used.

If, in this example, 5% by weight of divinyl benzene and 3% by weight of hexa-1,5-diene are used in place of 8% by weight of divinyl benzene, and n-heptane is used in place of white spirit, a bead polymer is obtained which undergoes a reduction in weight of 0.8% on extraction with benzene.

If, in the above example, 5% by weight of divinyl benzene and 3% by weight of 1,2,4-trivinyl-cyclohexane are used in place of 8% by weight of divinyl benzene, and isooctane is used in place of white spirit, the reduction in weight of the dry bead polymer on extraction with benzene is 1.0% and the residue after evaporation of the benzene extract is 0.7% by weight, based on bead polymer.

If, in the above example 5% by weight of divinyl benzene and 3% by weight of 1,2-4-trivinyl-cyclohexane are used in place of 8% by weight of divinyl benzene, the reduction in weight of the dry bead polymer on extraction with benzene amounts to 1.2% and the residue after evaporation of the benzene extract is 1.6% by weight based on the polymer used.

The bead polymer is hydrolyzed as in Example 1. After a 200 ml. sample of the cation exchanger resin thus obtained has been extracted for 20 hours with fully desalted water, and acid content of the extract is less than 0.1 mval.

325 g. of the bead polymer are heated for 48 hours at 135–140° C. with 800 g. of N,N-dimethyl-1,3-propylene diamine, the methanol formed being continuously distilled off through a column. After cooling, the resulting weakly basic macroporous anion exchanger is washed with water to remove any excess amine from it. Yield= 2000 ml., total capacity=1.6 mval./ml.

Example 4

0.05 g. of dibenzoyl peroxide are dissolved in a mixture of 10 g. of methyl acrylate and 0.3 g. of 1,2,4-trivinyl-cyclohexane. A clear hard polymer which undergoes pronounced swelling, but remains insoluble, in acetone and tetrahydrofuran, is formed by 16 hours' heating at 60–62° C. in a pressure tube.

Example 5

0.2 g. of hexa-1,5-diene and 0.04 g. of dibenzoyl peroxide are dissolved in 8 g. of methyl acrylate, and the mixture is heated in a pressure tube for 20 hours at 60° C. and then for 4 hours at 65° C. The resulting polymer is insoluble in acetone and tetrahydrofuran. A circular disc 10 mm. in diameter and 1 mm. thick, swells in acetone to a diameter of 18.5 mm.

Example 6

0.4 g. of 2,5-dimethylhexa-1,5-diene and 0.04 g. of dibenzoyl peroxide, are dissolved in 8 g. of methyl acrylate. The resulting mixture is heated in a pressure tube for 20 hours at 60° C. and for another 20 hours at 65° C. The solution solidifies to form a clear polymer which is insoluble in acetone and tetrahydrofuran. A circular disc of the polymer 10 mm. in diameter and approx. 1 mm. thick swells in acetone to a diameter of 15.5 mm.

We claim:

1. A homogeneous or macroreticular copolymer of an acrylic acid ester and 2–20% by weight based on the total monomers of a cross-linking agent of the formula

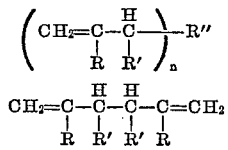

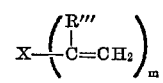

wherein
R,R' and R''' are hydrogen or alkyl of 1–6 carbon atoms;
R'' is a polyvalent alkyl radical having 1–14 carbon atoms;
X is a cyclohexane or cyclopentane and
$m$ and $n$ are 2–3.

2. The copolymer of claim 1 wherein an additional cross-linking agent is utilized, said agent being divinyl benzene, trivinylbenzene or divinylnaphthalene.

3. The copolymer of claim 2 containing copolymerized therewith styrene, ethylstyrene or esters of vinyl alcohol.

4. The copolymer of claim 1 wherein 5–15% cross-linking agent is utilized.

5. A cation exchanger obtained by hydrolyzing ester group of a matrix consisting of the copolymer of claim 1.

6. A cation exchanger obtained by hydrolyzing ester groups of a matrix consisting of the copolymer of claim 2.

7. A cation exchanger obtained by hydrolyzing ester groups of a matrix consisting of the copolymer of claim 3.

8. An anion exchanger obtained by aminolyzing the ester groups of a matrix consisting of the copolymer of claim 1.

9. An anion exchanger obtained by aminolyzing the ester groups of a matrix consisting of the copolymer of claim 2.

10. An anion exchanger obtained by aminolyzing the ester groups of a matrix consisting of the copolymer of claim 3.

References Cited

UNITED STATES PATENTS

| | | | |
|---|---|---|---|
| 2,597,437 | 5/1952 | Bodamer | 260—83.5 |
| 2,675,359 | 4/1954 | Schneider | 260—2.1 |
| 2,891,015 | 6/1959 | Tsunoda et al. | 260—2.2 |
| 3,297,664 | 1/1967 | Miskel et al. | 260—80.3 |

FOREIGN PATENTS 932,126    7/1963    Great Britain.

WILLIAM H. SHORT, *Primary Examiner.*

M. GOLDSTEIN, *Assistant Examiner.*

U.S. Cl. X.R.

260—2.1, 80.78, 80.81, 86.7